Patented June 10, 1930

1,762,152

UNITED STATES PATENT OFFICE

ARTHUR BIDDLE, OF TRENTON, NEW JERSEY, ASSIGNOR TO UNITED PRODUCTS CORPORATION OF AMERICA, A CORPORATION OF DELAWARE

COMPOSITION OF MATTER COMPRISING RESINS AND RUBBER IN AQUEOUS DISPERSION AND METHOD OF MAKING THE SAME

No Drawing. Application filed June 30, 1926. Serial No. 119,758.

This invention relates to a composition having adhesive properties and comprising resins and rubber in aqueous dispersion.

Among the objects of the invention are to provide a surface coating for paper, cloth and fibres; to provide a beater sizing for paper, asbestos or other fibrous materials; to provide a paint or surface sizing adaptable for use on walls, wood, etc. My composition will also be found adaptable for use in various other arts.

The rubber may be in its natural latex state in which it may, if desired, be treated with alkalies or other preserving agents, or an artificial aqueous dispersion of natural or synthetic rubber may be used.

The term "resins" as used contemplates water-soluble resin soaps and includes, among other species, copals and the resin gums commonly known as varnish gums. Of the resins, I have found that rosin or colophony may be advantageously used in my composition.

One of the useful properties of my composition resides in the flexibility given to the resin by the rubber constituent.

The aqueous dispersions of the resins may be accomplished by saponification, sulphonation or otherwise. A preferable method of saponifying resin is to subject it to the action of an alkali, preferably sodium carbonate, in the presence of water and heat, using, for example, 15 parts by weight of sodium carbonate to 100 parts of resin and from 200 to 400 parts of water, care being taken that the heat is not so great as to cause excessive boiling of the resin which may result in the resin, or a portion thereof, escaping from its container. To assist in the dispersion oils may be used and the resins dissolved therein and then aqueously dispersed or they may be made water soluble by sulphonation.

For certain uses hydrophilic colloids, such as starches, glues, soluble silicates, casein or casein solutions, or colloidal clays may be advantageously added to the resin and rubber. It will also be understood that vulcanizing agents and/or accelerating agents and/or insolubilizing agents, e. g. formaldehyde and potassium chromate, may be used in carrying out my invention and that coloring agents and fillers may also be employed when desirable.

After my composition has been made, the water present therein may be removed by evaporation or by any dehydrating agent such as alcohol, the latter also acting as a coagulant.

My composition may be applied in any suitable manner to fibres, paper, and felt stock and other fibrous articles and, if desired, thereafter vulcanized. When used in the art of making paper a coagulant such as alum or zinc sulphate serving to coagulate the resin and the rubber may be advantageously used at times. In the making of paper, after my composition of resin and rubber in aqueous dispersion has been mixed with the paper stock in the vat or other container, the coagulating agent may be added thereto as may also, if desired, the vulcanizing agent.

As one example of my composition which is adaptable for use as a beater size for paper or like material in which considerable flexibility is a necessary property, I give the following:

| | Parts by weight |
|---|---|
| Rubber in aqueous dispersion (approximately 35% rubber content) | 30 |
| Saponified rosin (approximately 25% rosin content) | 40 |

Another example of a beater size for paper or like material of the finer grades and greater gloss may be of the following composition:

| | Parts by weight |
|---|---|
| Rubber in aqueous dispersion (approximately 35% rubber content) | 25 |
| Saponified rosin (approximately 25% rosin content) | 40 |
| Casein solution (approximately 20% casein content) | 20 |

As an example of an embodiment of my composition suitable for use as a surface size or coating for paper, textiles, fabrics and like materials, I have found the following adaptable:

| | Parts by weight |
|---|---|
| Rubber in aqueous dispersion (approximately 35% rubber content) | 100 |
| Saponified rosin (approximately 25% rosin content) | 100 |
| Colloidal clay | 50 |
| Satin white | 25 |

For some uses of my invention, for example when it is to be used as a surface size or coating and a "velvety feel" is desired, suitable quantities of paraffine, preferably dissolved in oil, or oils, such as heavy petroleum, semi-drying, or oxidizing oils may be advantageously incorporated in the composition.

While I have herein described some particular compositions embodying my invention and methods of producing the same and also mentioned some of the arts in which my invention may be utilized, it is to be understood that the invention is not limited to those arts or to the precise methods, ingredients or proportions mentioned.

Having thus described my invention, I claim and desire to protect by Letters Patent of the United States:

1. A composition comprising a water soluble resin soap, an alkali, rubber latex in aqueous dispersion and casein in solution.

2. A composition comprising a water soluble resin soap having an alkaline metallic base, rubber latex, casein, and a casein solvent, in aqueous dispersion.

3. A composition of matter in aqueous dispersion substantially comprising the following:

| | Parts by weight |
|---|---|
| Rubber in aqueous dispersion (approximately 35% rubber content) | 25 |
| Saponified rosin (approximately 25% rosin content) | 40 |
| Casein solution (approximately 20% casein content) | 20 |

4. A composition comprising a water-soluble resin soap made by using a non-volatile alkali, rubber latex and a non-resinous hydrophlic colloid in aqueous dispersion.

In witness whereof I have hereunto set my hand this 29th day of June, 1926.

ARTHUR BIDDLE.